United States Patent [19]

Leyrer et al.

[11] Patent Number: 5,116,911
[45] Date of Patent: May 26, 1992

[54] METHACRYLATE (CO)POLYMERS CONTAINING CARBAZOLYL SIDE GROUPS AND ELECTROPHOTOGRAPHIC RECORDING ELEMENTS CONTAINING THE SAID (CO)POLYMERS

[75] Inventors: Reinhold J. Leyrer, Ludwigshafen; Harald Lauke, Mannheim; Bernhard Nick, Ludwigshafen; Peter Strohriegl, Hummeltal; Dietrich Haarer, Bayreuth, all of Fed. Rep. of Germany

[73] Assignee: BASF Aktiengesellschaft, Ludwigshafen, Fed. Rep. of Germany

[21] Appl. No.: 476,879

[22] Filed: Feb. 8, 1990

[30] Foreign Application Priority Data

Feb. 28, 1989 [DE] Fed. Rep. of Germany ........ 3906245

[51] Int. Cl.⁵ ............................................... C08F 8/30
[52] U.S. Cl. ................................ 525/329.9; 525/375; 526/259
[58] Field of Search .................. 525/329.9; 526/259

[56] References Cited

U.S. PATENT DOCUMENTS 3,316,087  4/1967  Munder et al.
4,415,641  11/1983  Goto et al.

OTHER PUBLICATIONS

Hu et al. Journal of Polymer Science: Part C, vol. 26, 441–446 (1988).
Makromolekulare Chemie, vol. 190 No. 7, Jul. 1989, pp. 1537–1545.
Hydroboration. XXXVI. A Direct Route to 9-Borabicyclo[3.3.1]nonane via . . . Brown et al., Journal of the American Chem. Soc./96:25/Dec. 11, 1974.
The Synthesis and Polymerization Studies of Some Higher Homologues of 9-Vinylcarbazole Heller et al.
Synthesis and High Hole Mobility of Isotactic Poly(-2-N-carbazolylethyl acrylate) Uryu et al., American Chemical Society, 1987 Macromolecules, vol. 20, No. 4.
Hole Transport Property of Poly(2-N-carbazolylethyl Methacrylate), Oshima et al. Journal of Polym. Sci., Polymer Letter S ED., vol. 23, 5.151–154 (1985).
Improved Hole Mobility of Polyacrylate Having a Carbazole Chromophore Macromolecules 1985, 18, 1043–1045.

*Primary Examiner*—Bernard Lipman
*Attorney, Agent, or Firm*—Keil & Weinkauf

[57] ABSTRACT

Methacrylate (co)polymers containing carbazolyl side groups contain or are composed of repeating units of the general formula (I)

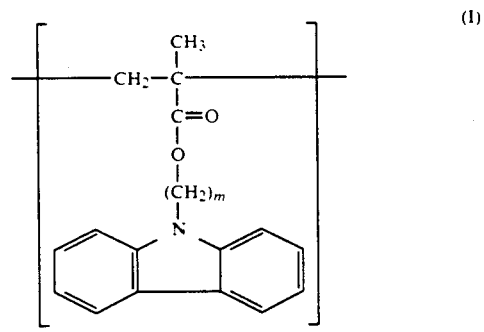

where m is an integer of from 3 to 11. The novel methacrylate (co)polymers containing carbazolyl side groups can advantageously be used as photoconductors in photoconductive layers, in particular of electrophotographic recording elements.

3 Claims, No Drawings

METHACRYLATE (CO)POLYMERS CONTAINING CARBAZOLYL SIDE GROUPS AND ELECTROPHOTOGRAPHIC RECORDING ELEMENTS CONTAINING THE SAID (CO)POLYMERS

The present invention relates to novel methacrylate (co)polymers containing carbazolyl side groups and the use of these (co)polymers for the production of solid, photoconductive layers. The present invention furthermore relates in particular to electrophotographic recording elements having an electrically conductive substrate and a solid, photoconductive layer consisting of the novel methacrylate (co)polymers containing carbazolyl side groups. The present invention also relates to electrophotographic offset printing plates which contain both novel and known (meth)acrylate (co)polymers as photoconductors.

Solid, photoconductive layers containing a photoconductive organic compound are becoming increasingly interesting for electrophotographic recording materials, such as copying films or electrophotographic offset printing plates. Polymeric materials are preferred as organic photoconductors which are used in the solid, photoconductive layers, as a rule together with sensitizers. The sensitizers may be used both for improving the spectral sensitivity and for producing charge carriers under the action of actinic light.

Among the known polymeric photoconductive compounds, poly-N-vinylcarbazole is particularly important owing to its good properties as a photoconductor. In the photoconductive layers, poly-N-vinylcarbazole is generally used together with a Lewis acid, in particular 2,4,7-trinitro-9-fluorenone, or other sensitizing organic dyes or pigments which increase the spectral sensitivity of the poly-N-vinylcarbazole and/or act as charge carrier-producing compounds. The relevant prior art includes, for example, EP-A-61 088, EP-A-61 089, EP-A-61 092, EP-A-131 215 and DE-A-32 08 337.

A considerable disadvantage of poly-N-vinylcarbazole is its high brittleness. Solid, photoconductive layers of poly-N-vinylcarbazole are hard, non-flexible and very susceptible to cracking. Furthermore, they exhibit only poor adhesion to metals, as used in electrophotographic recording materials, usually as electrically conductive substrates for the photoconductive layers. To overcome these disadvantages, plasticizers are often added to the photoconductive layers based on poly-N-vinylcarbazole, and these layers are as a rule applied to the metallic substrates by means of a primer. Both have a not inconsiderable adverse effect on the photoconductive properties of these layers or of the electrophotographic recording materials produced therefrom.

To overcome the known disadvantages of poly-N-vinylcarbazole, EP-A-224 784 proposes, as organic polymeric photoconductors, polysiloxanes having carbazole groups bonded to the polymer main chain as side groups. These carbazole-substituted polysiloxanes have photoconductor properties similar to those of poly-N-vinyl-carbazole but, in contrast to poly-N-vinylcarbazole, can be processed to give flexible, stable photoconductive layers having good adhesion to metallic substrates. However, a disadvantage of the carbazole-substituted polysiloxanes for use in electrophotographic offset printing plates is that it is virtually impossible to prepare stable, alkali-soluble derivatives from them. Moreover, the range of use of the carbazole-substituted polysiloxanes when employed in electrophotographic recording materials is regrettably limited owing to their relatively high tendency to become tacky.

U.S. Pat. No. 3 316 087 describes photoconductive layers for electrophotography, which are composed of a polymer of an aromatic and/or heterocyclic (meth)acrylate Inter alia, for example, poly-(N-carbazolyl-methyl acrylate) is also mentioned as a photoconductor. Moreover, the photoconductor properties of poly-(2-N-carbazolylethyl methacrylate) and poly-(2-N-carbazolylethyl acrylate) have already been investigated. For example, in Journ. of Polym. Sci., Polym. Letters Ed. 23 (1985), 151-154, and in Macromolecules 18 (1985), 1043-1045, it is shown that, despite the lower content of carbazole chromophores, the hole transport properties of poly-(2-N-carbazolylethyl methacrylate) obtained by free radical polymerization are similar to those of poly-N-vinylcarbazole, whereas the hole transport properties of poly-(2-N-carbazolylethyl acrylate) obtained by free radical polymerization is even an order of magnitude higher. According to Macromolecules 20 (1987), 712-716, the hole transport properties of anionically polymerized, isotactic poly-(2-N-carbazolylethyl acrylate) are even better than those of the corresponding atactic polyacrylate obtained by free radical polymerization. However, these known poly(meth)-acrylates carrying carbazolyl side groups have brittleness which is too great for practical use and poor adhesion to metallic substrates as usually used in electrophotographic recording elements.

For example, when corresponding electrophotographic recording elements having flexible substrates are clamped on printing cylinders or rollers, photoconductive layers of these known poly(meth)acrylates carrying carbazolyl side groups break off from the flexible substrate, so that these photoconductive layers can be employed, if at all, only with the use of adhesion promoters for flexible electrophotographic recording elements. However, the use of adhesion promoters in turn has an adverse effect on the performance characteristics of these electrophotographic recording elements.

Furthermore, the publication by Chau-Jin Hu et al., Synthesis and Photoinduced Discharge of Polyacrylates with Pendant Carbazole Group, in Journal of Polymer Science, Part C: Polymer Letters, 26 (1988), 441-446, describes polyacrylates which consist of repeating units of the general formula (Ia)

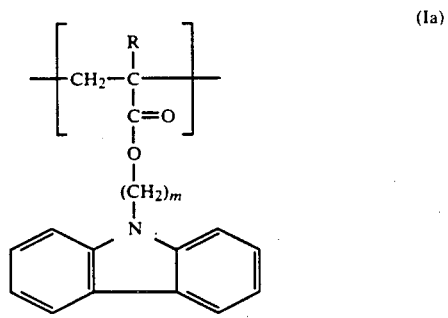

where R is hydrogen and m is 2, 3, 4, 5, 6 or 8. This publication also discloses electrophotographic recording elements which contain these polyacrylates (Ia) as photoconductors. On the other hand, neither electrophotographic offset printing plates nor methacrylate (co)-polymers are described in this publication.

It is an object of the present invention to provide novel polymeric compounds which have good photoconductor properties and permit the production of non-tacky photoconductive layers having good adhesion to metallic substrates and whose alkali solubility can be varied and adjusted to the desired extent. It is a further object of the present invention to provide electrophotographic recording elements which are suitable for clamping on drums or cylinders and have a flexible substrate with a metallic surface and whose photoconductive layer possesses good flexibility, is nontacky and exhibits good adhesion to the surface of the substrate.

We have found, surprisingly, that these objects are achieved by novel methacrylate (co)polymers of the type defined below, containing carbazolyl side groups, and by electrophotographic recording elements having a photoconductive layer based on these novel methacrylate (co)polymers containing carbazolyl side groups.

The present invention accordingly relates to methacrylate (co)polymers containing carbazolyl side groups, which (co)polymers contain or are composed of repeating units of the general formula (I)

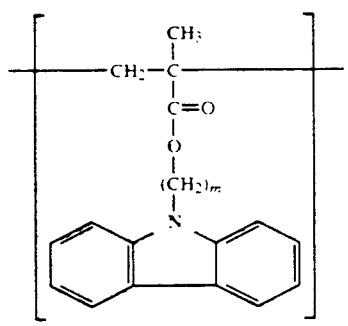

where m is an integer of from 3 to 11.

The present invention furthermore relates to an electrophotographic recording element which is suitable for clamping on drums or cylinders and has a flexible substrate with an electrically conductive surface and a solid, photoconductive layer applied atop, wherein the photoconductive layer contains, as the photoconductive compound, a methacrylate (co)polymer containing carbazolyl side groups which contains repeating units of the abovementioned general formula (I).

The present invention furthermore relates to an electrophotographic offset printing plate which can be developed in aqueous alkaline media and has a flexible electrically conductive substrate and a solid photoconductive layer which is applied atop and contains, as the photoconductor, at least one (meth)acrylate (co)polymer which contains or is composed of repeating units of the general formula (Ia)

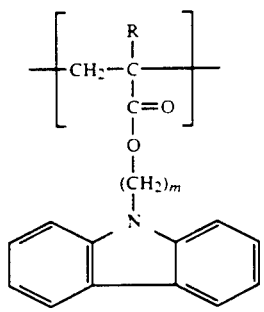

where m is an integer of from 3 to 11 and R is hydrogen or methyl.

The novel methacrylate (co)polymers containing carbazolyl side groups possess good photoconductivity and can be processed in an advantageous manner to give flexible, nontacky photoconductive layers having good adhesion to substrates with metallic surfaces. It is also possible to obtain stable, alkali-soluble products in a simple manner. The said methacrylate (co)polymers can therefore particularly advantageously be used for the production of electrophotographic recording elements having flexible substrates, which, during their use, have to withstand high bending stress, as occurs, for example, when recording elements are clamped on drums or cylinders. The novel electrophotographic recording elements are therefore very suitable for use in the form of electrophotographic copying films in copying technology as well as for the production of electrophotographic printing plates, as used in particular in offset printing.

The novel photoconductive methacrylate (co)polymers contain, as their essential component, repeating units of the general formula (I)

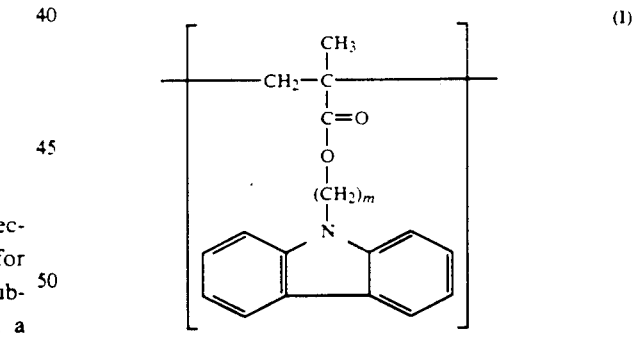

The repeating units of the general formula (I) are accordingly polymerized methacrylate structural units in which the alcohol radical of the ester group is formed from an N-carbazolyl radical bonded via an alkylene group to the oxygen atom of the ester function. The number m in the general formula (I) for the number of methylene groups in the alkylene radical which bonds the N-carbazolyl group to the oxygen atom of the ester function is from 3 to 11, advantageously from 4 to 11, in particular from 4 to 7, for the novel methacrylate (co)polymers. The carbazolyl radical in the repeating units of the general formula (I) may be substituted by, for example, one or more alkyl groups, alkoxy groups, amino groups, hydroxyl groups or halogen atoms, but in particular is unsubstituted.

The novel methacrylate (co)polymers containing carbazolyl side groups here may be composed of repeating methacrylate units of the general formula (I) only. The said methacrylate (co)polymers may also be composed of repeating acrylate units of the general formula (Ia) where R is H and repeating methacrylate units of the general formula (Ia) where R is $CH_3$. It is also possible for the novel methacrylate (co)polymers to contain further repeating units of polymerized monomers in addition to the repeating units of the general formula (I) or (Ia). Such other polymerized comonomers may be, for example, alkyl acrylates or alkyl methacrylates, in particular those where the alkyl radical is of 1 to 8 carbon atoms. If the novel methacrylate (co)polymers contain, for example, polymerized acrylic acid or methacrylic acid units as comonomer building blocks in addition to the repeating units of the general formula (I) or (Ia), the resulting methacrylate (co)polymers containing carbazolyl side groups have higher solubility in alkaline media. Such novel methacrylate (co)polymers which contain polymerized acrylic acid and/or methacrylic acid units in addition to the repeating units of the general formula (I) or (Ia) are therefore particularly advantageous for the production of photoconductive layers of electrophotographic printing plates, since the latter are generally washed out with alkaline developers after imagewise exposure. For this intended use, conventional (meth)acrylate (co)polymers, for example those of the general formula (Ia) where R is hydrogen and m is 2, 3, 4, 5, 6 or 8, are also suitable. The novel methacrylate (co)polymers containing carbazolyl side groups should in general contain not less than 60% of repeating units of the general formula (I) in order to achieve good and sufficient photoconductivity. In view of their use in the electrophotographic recording elements, preferred novel methacrylate (co)polymers are those which are composed of from 80 to 100% of repeating units of the general formula (I). The said methacrylate (co)polymers are solid at room temperature; the molecular weight is in the range usually encountered for polymethacrylates. They preferably have a mean weight average molecular weight of from 20,000 to 300,000, in particular from 50,000 to 200,000.

The novel methacrylate (co)polymers containing carbazolyl side groups can be prepared in a conventional manner by polymerization or copolymerization of the monomers from which these polymers are derived. The polymerization can be carried out, for example, as a free radical polymerization in solution using the conventional free radical initiators, for example azobisisobutyronitrile. The monomeric N-carbazolylalkyl acrylates or methacrylates from which the repeating units of the general formula (I) or (Ia) are derived can be prepared by known methods of organic chemistry, for example in accordance with the following equation:

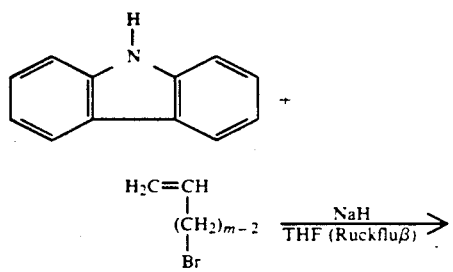

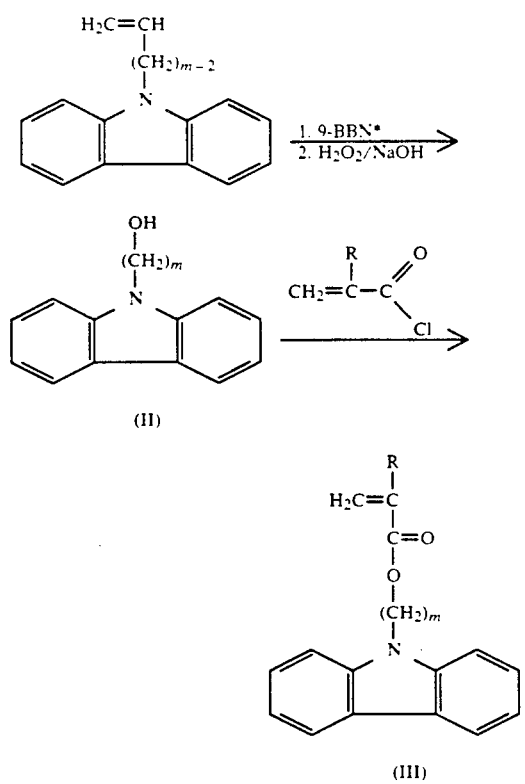

In the equation, R and m have the same meanings as in the general formula (I) stated further above. In the synthesis route, indicated in the equation, for the preparation of the monomeric N-carbazolylalkyl acrylates or methacrylates of the general formula (III), carbazole is used as a starting material and is reacted with the appropriate alkenyl halides by the methods of synthesis described by J. Heller, D. J. Lyman and W. A. Hewett, Makromol. Chem. 73 (19864), 48, to give the N-alkenylcarbazoles. These N-alkenylcarbazoles are converted into the N-carbazolylalkanols of the general formula (II) by hydroboration with 9-borabicyclo[3.3.1]nonane (9-BBN). The hydroboration reaction can be carried out similarly to the method described by H. C. Brown, E. S. Knights and G. G. Scouten, J. Amer. Chem. Soc. 96 (1974), 7765. The monomeric acrylates or methacrylates of the general formula (III), carrying carbazolyl side groups, can be prepared from the alcohols of the formula (II) by simple reaction with acryloyl chloride or methacryloyl chloride under the usual conditions. The preparation of the monomeric, carbazolyl-carrying (meth)acrylates and of the novel methacrylate (co)polymers containing carbazolyl side groups is furthermore illustrated by the examples below.

The said methacrylate (co)polymers can be employed as photoconductors wherever poly-N-vinylcarbazole or other photoconducting carbazolyl-containing polymers have been used as photoconductors to date. Compared with the known materials, the said methacrylate (co)polymers have substantial and surprising advantages when used in photoconductive layers. For example, the photoconductive layers produced from the said methacrylate (co)polymers are not only flexible and non-brittle but are also non-tacky and simultaneously exhibit good adhesion to metallic surfaces. The photoconductive layers produced according to the invention therefore have a wide range of applications. As in the case of poly-N-vinylcarbazole, it is possible and in general advantageous to use the said methacrylate (co)-polymers together with dopants and/or sensitizers when the said methacrylate (co)-polymers are used as photoconductors in photoconductive layers. The known dopants and sensitizers conventionally used for poly-N-vinylcarbazole, for example electron acceptor materials capable of forming a charge transfer complex with the carbazolyl groups, are suitable for this purpose. Typical examples of these are Lewis acids, such as 2,4,7-trinitrofluorenone, 2,4,5,7-tetranitrofluorenone, chloranil and tetracyanoquinonedimethane.

Photoconductive layers of the novel methacrylate (co)polymers containing carbazolyl side groups can be produced by conventional methods, for example by casting from solution and evaporating the solvent. The said methacrylate (co)polymers which act as photoconductors may also be used here together with other photoconductors and/or solid, polymeric binders. However, it has proven advantageous to form the photoconductive layers only from the said methacrylate (co)-polymers, if desired together with the stated dopants and/or sensitizers for this purpose.

Sensitizers which may be added to the photoconductive layers of the said methacrylate (co)polymers for increasing the photosensitivity and/or photoconductivity are in principle all organic dyes or organic pigments which are known and conventionally used for sensitizing photoconductive layers of poly-N-vinylcarbazole or other photoconductive compounds containing carbazolyl groups. These include both dyes which are spectral sensitizers, i.e. organic dyes which improve the spectral sensitivity of the photoconductive layer, and dyes and pigments which, under the action of actinic light, are capable or producing charge carriers and of transporting these to the photoconductive compound with the aid of an electric field applied to the photoconductive layer from outside. Sensitization may be effected homogeneously or heterogeneously, depending on the type of sensitizer used and the field of use of the photoconductive layer or of the electrophotographic recording element. In the case of homogeneously sensitized photoconductive layers, the sensitizers are present as a homogeneous mixture with the methacrylate (co)-polymers containing carbazolyl side groups and used according to the invention as a photoconductor. For these single-stratum, homogeneously sensitized photoconductive layers, in particular the soluble organic dyes can be used as sensitizers in a conventional manner. Organic pigments on the other hand are preferably used for multi-stratum, heterogeneously sensitized photoconductive layers in which the sensitizer and the said methacrylate (co)polymers are present in separate, discrete strata one on top of the other, in the form of a composite structure. In the case of the multistratum, heterogeneously sensitized photoconductive layers, the first stratum generally contains the sensitizer and the second stratum arranged on top generally contains the photoconductive compound. Suitable sensitizers in this case are not only organic pigments but also inorganic materials, for example selenium or other compounds which produce charge carriers of the electric current under the action of actinic light. Single-stratum homogeneously sensitized photoconductive layers contain the sensitizer in general in an amount of about 0.5–10% by weight, based on the photoconductive compound present in the photoconductive layer.

The organic dyes which are suitable as sensitizers for the novel single-stratum homogeneously sensitized photoconductive layers include, in particular, the triarylmethane dyes, xanthene dyes, cyanine dyes, thiazine dyes and others. The dyes or pigments which are suitable as sensitizers for the multi-stratum heterogeneously sensitized novel photoconductive layers include azo dyes, phthalocyanines and isoindoline dyes. Dyes or pigments from the series consisting of the perylene-3,4:9,10-tetracarboxylic acid derivatives have proven particularly advantageous for sensitizing both the single-stratum homogeneously sensitized and the multistratum heterogeneously sensitized novel photoconductive layers.

As stated, the production of the novel photoconductive layers or of the electrophotographic recording elements containing such photoconductive layers can be carried out by conventional methods and process technologies, as known per se and described sufficiently in the relevant literature. Novel single-stratum photoconductive layers generally have a layer thickness of about 0.8–40 μm when dry, the layer thickness depending on the intended use. For example, the thickness of single-stratum photoconductive layers in electrophotographic printing plates is in particular from 0.8 to 6 μm and that in copying films is about 5–25 μm. In the case of the novel multi-stratum heterogeneously sensitized photoconductive layers, the first stratum consisting of the sensitizer is in general from 0.005 to 5 μm, in particular from 0.1 to 1.5 μm, thick when dry, and the second stratum consisting of the photoconductor is in general about 1–40 μm, preferably 5–25 μm, in particular 7–15 μm, thick when dry. In the novel multi-stratum heterogeneously sensitized photoconductive layers, the second stratum is preferably produced solely from the novel methacrylate (co)polymers containing carbazolyl side groups, as photoconductors.

A particular advantage of the novel methacrylate (co)polymers containing carbazolyl side groups is that solid, photoconductive layers produced therefrom and present in electrophotographic recording elements can be applied to flexible, electrically conductive substrates in the absence of a special adhesion-promoting layer, without the photoconductive layer breaking or flaking off under a high bending stress as encountered, for example, when electrophotographic recording elements are clamped on drums or cylinders. Nevertheless, the novel photoconductive layers are nontacky at room temperature so that they can be used generally and widely without special measures. Because of their properties, the photoconductive layers prepared using the said methacrylate (co)polymers are thus particularly suitable for the production of electrophotographic recording elements which are suitable for clamping on drums or cylinders, for example copying films, i.e. electrophotographic films for the copying sector, or electrophotographic printing plates, in particular electrophotographic offset printing plates. The fact that the alkali solubility of the said methacrylate (co)polymers or of the known (meth)acrylate (co)polymers can be varied and selectively adjusted in the desired range by incorporating comonomer building blocks containing acid groups, in particular COOH groups, into the polymer main chain is also particularly advantageous for the last-mentioned application.

In the electrophotographic recording elements, the novel solid, photoconductive layers are applied to an electrically conductive substrate. In principle, all electrically conductive substrates, as known per se and conventionally used for electrophotographic recording materials, can be used as the electrically conductive substrates for the electrophotographic recording elements. The novel solid, photoconductive layers are particularly suitable for electrophotographic recording elements having flexible substrates. Depending on the field of use of the novel electrophotographic recording elements, preferred electrically conductive substrates are aluminum, zinc, magnesium, copper or multimetal sheets, for example untreated or pretreated, for example roughened and/or anodized, aluminum sheets, aluminum foils, nickel sheets or plastic films, preferably polyester films, for example films of polyethylene terephthalate or polybutylene terephthalate, coated with aluminum, tin, lead, bismuth or similar metals by vapor deposition. Other suitable substrates for the novel electrophotographic recording elements are electrically conductive special papers. In addition to the flat, level substrates, cylindrical substrates, for example metal cylinders or cylinders having a metallic surface, can also be used. For the production of the electrophotographic recording elements, the novel photoconductive layers are applied to the electrically conductive substrates in a conventional manner. This is preferably done simultaneously with the production of the said layer, for example by producing the novel solid, photoconductive layer from solution on the electrically conductive substrate.

The novel electrophotographic recording elements may contain barrier layers, for example of metal oxides, such as alumina, polymers, e.g. polyamide, polyvinyl alcohol, polystyrene or similar systems, between the electrically conductive substrate and the solid photoconductive layer or, in the case of recording elements having a multi-stratum photoconductive layer, also between the individual stratum of the photoconductive layer, such barrier layers being known per se and conventionally used for such recording elements.

The Examples which follow illustrate the invention. In the Examples, parts and percentages are by weight, unless stated otherwise.

EXAMPLE 1

Preparation of poly-(6-N-carbazolylhexyl methacrylate)

200 ml of a solution of 9-borabicyclo[3.3.1]-nonane (9-BBN) in tetrahydrofuran (0.5 mol/1) were initially taken in a thoroughly heated 500 ml three-necked flask. After the dropwise addition of a solution of 100 mmol of N-5-hexenylcarbazole in 100 ml of dry tetrahydrofuran, the mixture was stirred for 3 hours at room temperature, after which 60 ml of ethanol, 20 ml of 6 N sodium hydroxide solution and 40 ml of hydrogen peroxide (30% strength) were added in succession. Refluxing was carried out for 1 hour, after which the reaction mixture was worked up by adding 200 ml of water and then stripping off the tetrahydrofuran. The resulting N-(6-hydroxyhexyl)-carbazole was extracted with ether, the ether extract was dried and the ether was evaporated. The resulting crude product was then recrystallized from 9:1 hexane/acetone. The pure N-(6-hydroxyhexyl)-carbazole obtained in 61% yield was in the form of white crystals.

A solution of 30 mmol of methacryloyl chloride in 10 ml of dichloromethane was added dropwise to a solution of 25 mmol of N-(6-hydroxyhexyl)-carbazole and 30 mmol of triethylamine in 100 ml of dry dichloromethane. Thereafter, the reaction mixture was stirred for 3 hours at room temperature and then worked up by washing it with 2 N sodium hydroxide solution and water. After the reaction mixture had been evaporated down, the 6-(N-carbazolyl)-hexyl methacrylate formed was isolated by column chromatography over silica gel (eluent: dichloromethane). The 6-(N-carbazolyl)-hexyl methacrylate thus obtained in 70% yield was in the form of a colorless oil and had the following characteristic data:

IR (film): 1715 cm$^{-1}$ (ester), 1635 cm$^{-1}$ (C=C) 1625, 1595, 750, 720 cm$^{-1}$ (carbazole)

$^1$H-NMR(CDCl$_3$): $\delta = 1.3$–1.9 (m), 4.02 (t), 4.23 (t), 5.46 (m), 6.00 (m), 7.1–7.2 (m), 7.3–7.5 (m), 8.0–8.1 (m)

Intensity ratio: 11 : 2 : 2 : 1 : 1 : 2 : 4 : 2

17.6 mmol of 6-(N-carbazolyl)-hexyl methacrylate and 0.18 mmol of azobisisobutyronitrile were dissolved in 50 ml of toluene, and the solution was degassed and then heated at 60° C. for 48 hours, while stirring. After the solution had cooled, the resulting polymer was precipitated in methanol and, for further purification, reprecipitated twice from chloroform/methanol. In this way, poly(6-N-carbazolylhexyl methacrylate) was obtained in a yield of 88%. The polymer was characterized by IR spectroscopy and GPC. The characteristic data are reproduced below.

IR. (film): 1720 cm$^{-1}$ (ester), 1625, 1595, 750, 720 cm$^{-1}$ (carbazole)

GPC: The molecular weight determined by GPC (polystyrene standards) was 66,000 ($M_w$: 84,000, $M_n$: 28,000, $M_w/M_n = 3.1$)

EXAMPLES 2 AND 3

The following further polymers were prepared in a manner similar to that described in Example 1 and were characterized by the corresponding analytical methods: poly-(3-N-carbazolylpropyl methacrylate) and poly-(11-N-carbazolylundecyl methacrylate). All polymers thus prepared were nontacky and solid at room temperature. Their weight average molecular weight was from 50,000 to 100,000.

EXAMPLES 4 TO 6

Production of electrophotographic recording elements

14% strength solutions in tetrahydrofuran of the novel methacrylate polymers containing carbazolyl side groups and obtained according to Examples 1 to 3 were prepared. These solutions were filtered and then poured onto substrate films coated with selenium with vapor deposition, and the tetrahydrofuran was evaporated off. After drying, the photoconductor layers had a thickness of 10 $\mu$m. The substrate films coated with selenium by vapor deposition was a polyethylene terephthalate film about 100 $\mu$m thick, which had been provided with a thin aluminum layer by vapor deposition. The selenium layer applied to the aluminum by vapor deposition had a thickness of about 1 $\mu$m.

In all of the resulting electrophotographic recording elements, the photoconductor layer of the novel methacrylate polymers containing carbazolyl side groups adhered firmly to the said substrate film and did not break or flake off even on bending the recording element. The photoconductor properties measured for these electrophotographic recording elements are shown in the Table below.

For comparison, an electrophotographic recording element was produced in which a 10 μm thick photoconductor layer of poly-(2-N-carbazolylethyl methacrylate) prepared by free radical polymerization, as known from the prior art, had been applied to the substrate film coated with selenium with vapor deposition. On bending the recording element, the photoconductor layer broke and partially flaked off from the substrate.

TABLE

| | Measurement of the photoconductivity | | | |
|---|---|---|---|---|
| Example | Photoconductor | $E_{max}$ kV/m | Dark decay % | Photo-induced discharge % | Half life ms |
| 4 | Poly-(6-N-carbazolyl-hexyl methacrylate) from Example 1 | 229 | 8 | 50 | 149 |
| 5 | Poly-(3-N-carbazolyl-propyl methacrylate) from Example 2 | 52 | 18 | 49 | 188 |
| 6 | Poly-(11-N-carbazolyl-undecyl methacrylate) from Example 3 | 185 | 22 | 56 | 130 |

We claim:

1. A methacrylate (co)polymer containing carbazolyl side groups which comprises not less than 60% of repeating units of the formula (I)

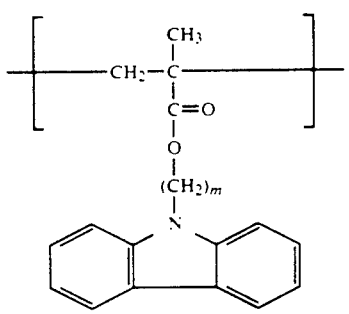

where m is an integer of from 3 to 11.

2. A methacrylate (co)polymer as defined in claim 1, wherein m is an integer of from 4 to 11.

3. A methacrylate (co)polymer as defined in claim 1, wherein m is an integer of from 4 to 7.

* * * * *